United States Patent
Yoshioka et al.

(10) Patent No.: US 12,323,246 B2
(45) Date of Patent: Jun. 3, 2025

(54) TERMINAL, COMMUNICATION METHOD, AND WIRELESS COMMUNICATION SYSTEM FOR SIDELINK TRANSMISSION

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 401 days.

(21) Appl. No.: 17/753,760

(22) PCT Filed: Sep. 26, 2019

(86) PCT No.: PCT/JP2019/038052
§ 371 (c)(1),
(2) Date: Mar. 14, 2022

(87) PCT Pub. No.: WO2021/059462
PCT Pub. Date: Apr. 1, 2021

(65) Prior Publication Data
US 2022/0376831 A1    Nov. 24, 2022

(51) Int. Cl.
*H04L 1/16*    (2023.01)
*H04W 72/02*    (2009.01)

(52) U.S. Cl.
CPC .............. *H04L 1/16* (2013.01); *H04W 72/02* (2013.01)

(58) Field of Classification Search
CPC ................................. H04L 1/16; H04W 72/02
See application file for complete search history.

(56) References Cited

U.S. PATENT DOCUMENTS

2020/0220694 A1* 7/2020 Khoryaev ............. H04W 28/04
2021/0336688 A1* 10/2021 Lee ......................... H04W 4/40

OTHER PUBLICATIONS

International Search Report for corresponding International Application No. PCT/JP2019/038052, mailed Mar. 3, 2020 (4 pages).
Written Opinion for corresponding International Application No. PCT/JP2019/038052, mailed Mar. 3, 2020 (4 pages).
MediaTek Inc .; "On sidelink mode-2 resource allocation"; 3GPP TSG RAN WG1 Meeting #97, R1-1906555; Reno, USA; May 13-17, 2019 (8 pages).
LG Electronics; "Discussion on resource allocation for Mode 2"; 3GPP TSG RAN WG1 #98, R1-1908902; Prague, Czech Republic; Aug. 26-30, 2019 (13 pages).
Intel Corporation; "UE-Autonomous Resource Allocation for NR V2X Sidelink Communication"; 3GPP TSG RAN WG1 Meeting #98, R1-1908635; Prague, Czech Republic; Aug. 26-30, 2019 (28 pages).

(Continued)

*Primary Examiner* — Won C Kim
(74) *Attorney, Agent, or Firm* — Osha Bergman Watanabe & Burton LLP

(57) ABSTRACT

A terminal includes a control unit configured to perform resource selection by which a channel receiving a response related to retransmission control is secured, in a case where the terminal selects a resource to be used autonomously from resource candidates, a transmission unit configured to transmit data to another terminal using the resource candidates, and a reception unit configured to receive the response related to retransmission control corresponding to the data from the another terminal.

5 Claims, 14 Drawing Sheets

(56) References Cited

OTHER PUBLICATIONS

3GPP TS 36.211 V15.6.0; "3rd Generation Partnership Project; Technical Specification Group Radio Access Network; Evolved Universal Terrestrial Radio Acess (E-UTRA); Physical channels and modulation (Release 15)"; Jun. 2019 (239 pages).
3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).
Extended European Search Report issued in counterpart European Patent Application No. 19946384.5, mailed on Mar. 23, 2023 (7 pages).
Office Action issued in counterpart Japanese Patent Application No. 2021-548104 mailed on Jul. 25, 2023 (6 pages).
Office Action issued in counterpart Japanese Patent Application No. 2021-548104 mailed on Nov. 14, 2023 (5 pages).

* cited by examiner

TERMINAL, COMMUNICATION METHOD, AND WIRELESS COMMUNICATION SYSTEM FOR SIDELINK TRANSMISSION

TECHNICAL FIELD

The present invention relates to a terminal and a communication method in a wireless communication system.

BACKGROUND ART

In the Long Term Evolution (LTE) and LTE successor systems (e.g., LTE Advanced (LTE-A), New Radio (NR, also called 5G)), a Device to Device (D2D) technology in which terminals communicate directly with each other without a base station is being discussed (e.g., Non-Patent Document 1).

D2D reduces traffic between terminals and base stations and enables communication between terminals even when a base station is unable to perform communications in time of a disaster, etc. Although 3rd Generation Partnership Project (3GPP) refers to D2D as a "sidelink", the term D2D is used herein more generally. However, in the description of the embodiment described below, sidelink is also used as needed.

D2D communication is broadly classified into: D2D discovery for discovering other terminals capable of communication; and D2D communication (D2D direct communication, D2D communication, direct communication between terminals, etc.) for communicating directly between terminals. Hereinafter, when D2D communication, D2D discovery, etc. are not specifically distinguished, they are simply called D2D. A signal sent and received by D2D is called a D2D signal. Various use cases of Vehicle to Everything (V2X) services in NR have been discussed (e.g., Non-Patent Document 2).

PRIOR ART DOCUMENTS

Non-Patent Documents

Non-Patent Document 1: 3GPP TS 36.211 V15.6.0(2019-06)
Non-Patent Document 2: 3GPP TR 22.886 V15.1.0(2017-03)

SUMMARY OF INVENTION

Problem to be Solved by the Invention

Direct communication between terminals in NR-V2X is being discussed to support Hybrid automatic repeat request (HARQ). On the other hand, when a transmit mode, in which a terminal selects resources autonomously, is applied, the method of resource selection is not necessarily clearly defined by considering the arrangement of Physical Sidelink Feedback Channel (PSFCH) that is a channel for transmitting and receiving HARQ responses.

The present invention has been made in view of the foregoing, and is intended to enable a terminal to autonomously select resources in accordance with retransmission control in direct communication between terminals.

Means for Solving Problems

According to the disclosed technique, there is provided a terminal comprising a control unit configured to perform resource selection by which a channel receiving a response related to retransmission control is secured, in a case where the terminal selects a resource to be used autonomously from resource candidates, a transmission unit configured to transmit data to another terminal using the resource candidates, and a reception unit configured to receive a response related to retransmission control corresponding to the data from the another terminal.

Effects of the Invention

According to the disclosed technology, a terminal can autonomously select resources in accordance with retransmission control in direct communication between terminals.

MODE FOR CARRYING OUT THE INVENTION

Hereafter, embodiments of the present invention will be described with reference to the appended drawings. Embodiments to be described below are examples, and embodiments to which the present invention is applied are not limited to the following embodiments.

The existing technology is appropriately used for an operation of a wireless communication system of an embodiment of the present invention. Here, the existing technology is, for example, the existing LTE but is not limited to the existing LTE. The term "LTE" used in this specification has a broad meaning including LTE-Advanced and schemes after LTE-Advanced (for example, NR) or Wireless Local Area Network (LAN) unless otherwise specified.

Also, according to an embodiment of the present invention, a duplex scheme may be a Time Division Duplex (TDD) scheme, may be a Frequency Division Duplex (FDD) scheme, or may be other schemes (for example, Flexible Duplex or the like).

Further, according to an embodiment of the present invention, when a radio parameter or the like is "configured", it may mean that a predetermined value is pre-configured or may mean that a radio parameter indicated by a base station 10 or a terminal 20 may be configured.

Figure 1:
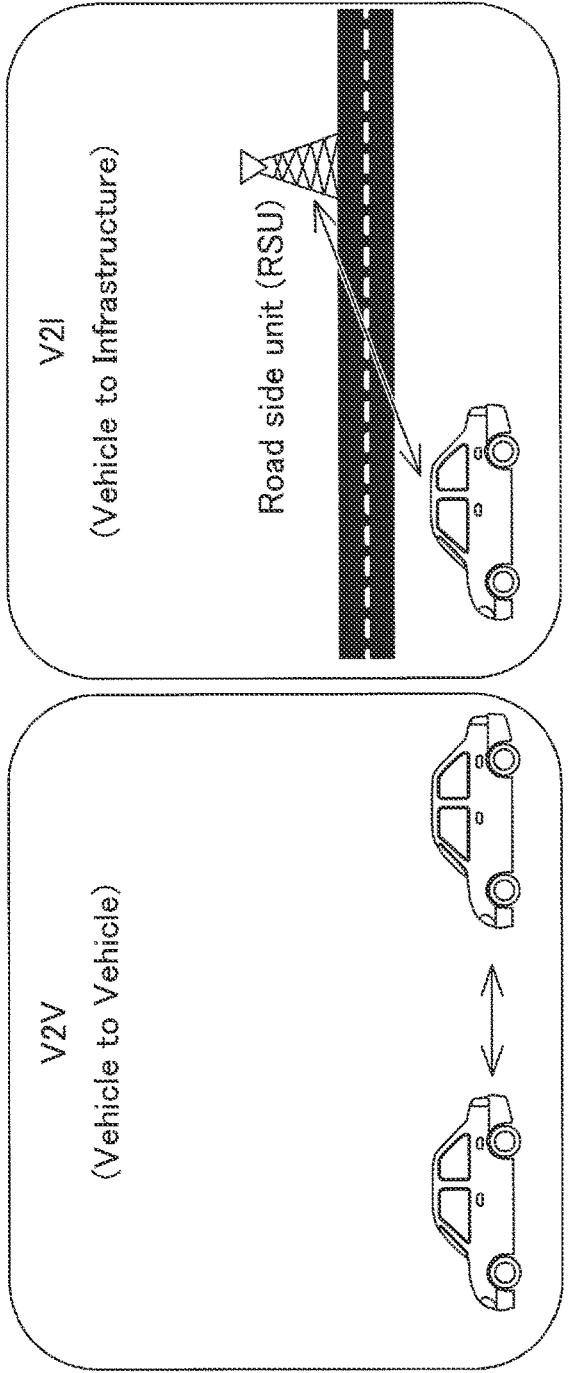
FIG. 1 is a diagram illustrating V2X.
Figure 1:
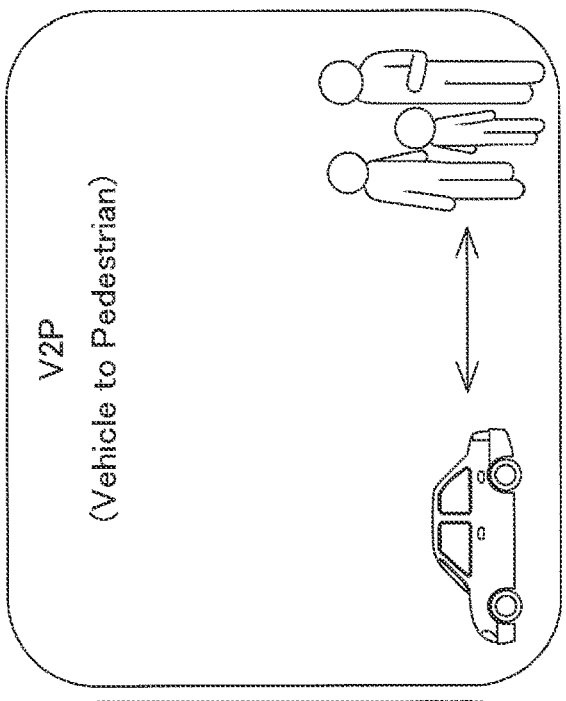
Figure 1:
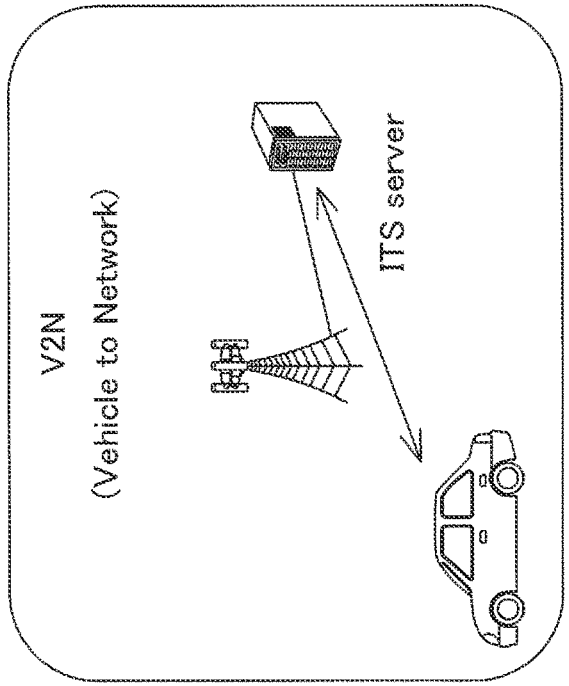

FIG. 1 is a diagram for illustrating V2X. In 3GPP, D2D function is being extended to realize Vehicle to Everything (V2X) or enhanced V2X (eV2X) and the specification is being promoted. As shown in FIG. 1, V2X is a collective term for Vehicle to Vehicle (V2V), which is a part of ITS (Intelligent Transport Systems), which means a form of communication between vehicles, Vehicle to Infrastructure (V2I), which means a form of communication between vehicles and roadside equipment (RSU:RoadSide Unit), Vehicle to Network (V2N), which means a form of communication between vehicles and ITS servers, and Vehicle to Pedestrian (V2P), which means a form of communication between vehicles and mobile terminals carried by pedestrians.

In addition, V2X using LTE or NR cellular communication and terminal-to-terminal communication is under review in 3GPP. V2X using cellular communication is also called cellular V2X. NR's V2X is being studied for realizing large capacity, low delay, high reliability, and QoS (Quality of Service) control.

It is anticipated that V2X of LTE or NR will be studied not only in 3GPP specification but also in the future. For example, it is envisaged that interoperability, cost reduction by upper layer implementation, Radio Access Technology (RAT) combination or switching methods, regulatory compliance in each country, and data acquisition, distribution, database management and utilization method by LTE or NR V2X platforms will be considered.

In embodiments of the present invention, it is primarily assumed that a communication device is mounted on a vehicle, but embodiments of the present invention are not limited to such embodiments. For example, a communication device may be a terminal held by a person, a communication device may be a drone or airplane mounted device, or a communication device may be a base station, an RSU, a relay station (relay node), a terminal having scheduling capability, or the like.

Note that Sidelink (SL) may be distinguished from Uplink (UL) or Downlink (DL) on the basis of any one of the following 1)-4) or combinations. SL may also be another name.
1) Resource allocation in time domain
2) Resource allocation in frequency domain
3) Synchronization signal to be referenced (including Sidelink Synchronization Signal (SLSS))
4) Reference signal used for path-loss measurement for transmission power control Also, for SL or UL Orthogonal Frequency Division Multiplexing (OFDM), any one of Cyclic-Prefix OFDM (CP-OFDM), Discrete Fourier Transform-Spread-OFDM (DFT-S-OFDM), OFDM without Transform precoding or OFDM with Transform precoding may be applied.

In SL of LTE, Mode3 and Mode4 are defined for allocating SL resources to a terminal 20. In Mode3, transmission resources are dynamically allocated by Downlink Control Information (DCI) transmitted from a base station 10 to a terminal 20. In Mode3, Semi Persistent Scheduling (SPS) is also available. In Mode4, a terminal 20 autonomously selects a transmit resource from a resource pool.

Slots in embodiments of the present invention may be replaced by symbols, minislots, subframes, wireless frames, and Transmission Time Interval (TTIs). Cells in embodiments of the present invention may also be read as cell groups, carrier components, BWPs, resource pools, resources, Radio Access Technology (RAT), systems (including wireless LANs), and the like.

Figure 2:
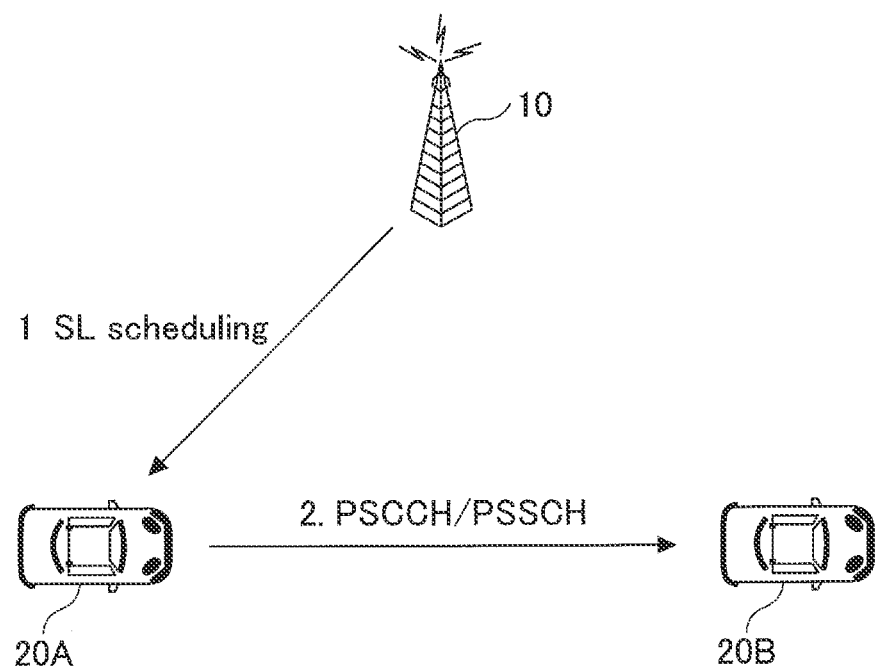
FIG. 2 is a diagram illustrating an example (1) of a transmission mode of V2X.

FIG. 2 is a diagram illustrating an example (1) of a transmission mode of V2X. In the sidelink communication transmission mode shown in FIG. 2, in step 1, a base station 10 transmits a sidelink scheduling to a terminal 20A. Subsequently, the terminal 20A transmits Physical Sidelink Control Channel (PSCCH) and Physical Sidelink Shared Channel (PSSCH) to a terminal 20B based on the received scheduling (Step 2). The transmission mode of the sidelink communication shown in FIG. 2 may be referred to as sidelink transmission mode 3 in LTE. In the sidelink transmission mode 3 in LTE, Uu-based sidelink scheduling is performed. Uu is a wireless interface between Universal Terrestrial Radio Access Network (UTRAN) and User Equipment (UE). The transmission mode of the sidelink communication shown in FIG. 2 may be referred to as sidelink transmission mode 1 in NR.

Figure 3:
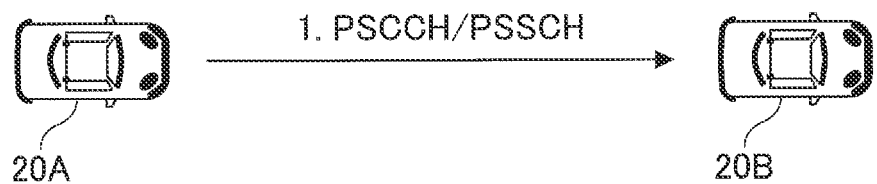
FIG. 3 is a diagram illustrating an example (2) of a transmission mode of V2X.

FIG. 3 is a diagram illustrating an example (2) of a transmission mode of V2X. In the sidelink communication transmission mode shown in FIG. 3, in step 1, a terminal 20A transmits PSCCH and PSSCH to a terminal 20B using autonomously selected resources. The transmission mode of the sidelink communication shown in FIG. 3 may be referred to as sidelink transmission mode 4 in LTE. In the side link transmission mode 4 in LTE, the UE itself performs resource selection.

Figure 4:
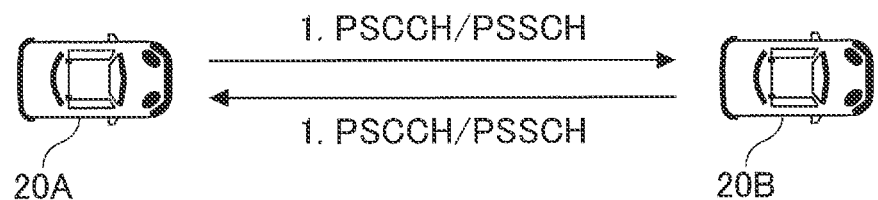
FIG. 4 is a diagram illustrating an example (3) of a transmission mode of V2X.

FIG. 4 is a diagram for illustrating an example (3) of a transmission mode of V2X. In the sidelink communication transmission mode shown in FIG. 4, in step 1, a terminal 20A transmits PSCCH and PSSCH to a terminal 20B using autonomously selected resources. Similarly, the terminal 20B transmits PSCCH and PSSCH to the terminal 20A using autonomously selected resources (step 1). The transmission mode of the sidelink communication shown in FIG. 4 may be referred to as sidelink transmission mode 2a in NR. In the sidelink transmission mode 2 in NR, the terminal 20 itself performs resource selection.

Figure 5:
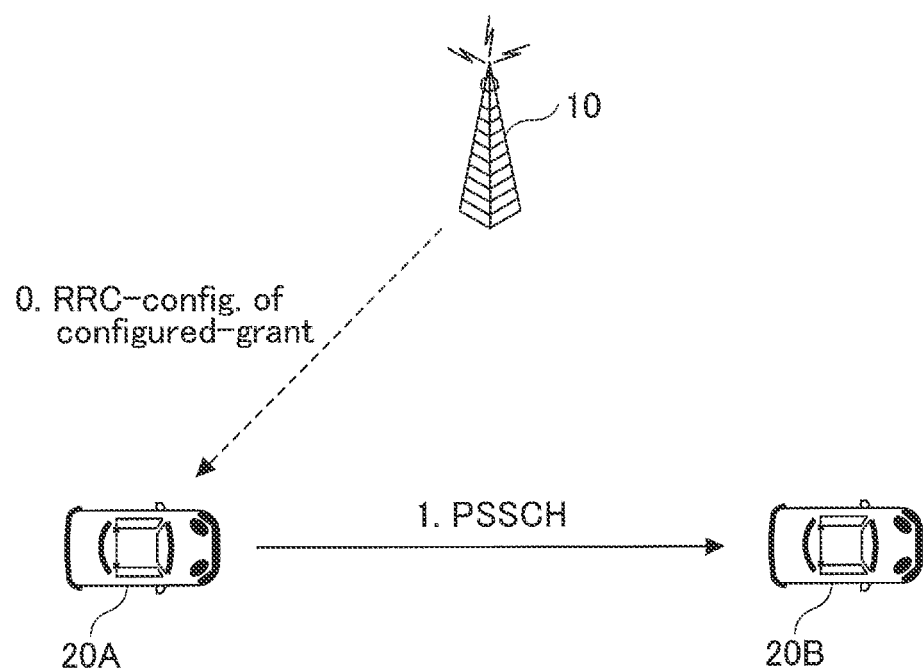
FIG. 5 is a diagram illustrating an example (4) of a transmission mode of V2X.

FIG. 5 is a diagram for illustrating an example (4) of a transmission mode of V2X. In the sidelink communication transmission mode shown in FIG. 5, in step 0, a base station 10 transmits the sidelink grant to a terminal 20A via the Radio Resource Control (RRC) configuration. Subsequently, in Step 1, the terminal 20A transmits PSSCH to a terminal 20B based on the received resource pattern. The transmission mode of the sidelink communication shown in FIG. 5 may be referred to as sidelink transmission mode 2c in NR.

Figure 6:
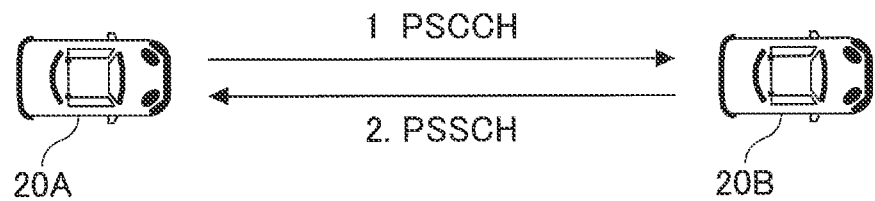
FIG. 6 is a diagram illustrating an example (5) of a transmission mode of V2X.

FIG. 6 is a diagram for illustrating an example (5) of a transmission mode of V2X. In the sidelink communication transmission mode shown in FIG. 6, in step 1, a terminal 20A transmits the sidelink scheduling to a terminal 20B via the PSCCH. Subsequently, in Step 2, the terminal 20B transmits PSSCH to the terminal 20A based on the received scheduling. The transmission mode of the sidelink communication shown in FIG. 6 may be referred to as sidelink transmission mode 2d in NR.

Figure 7:
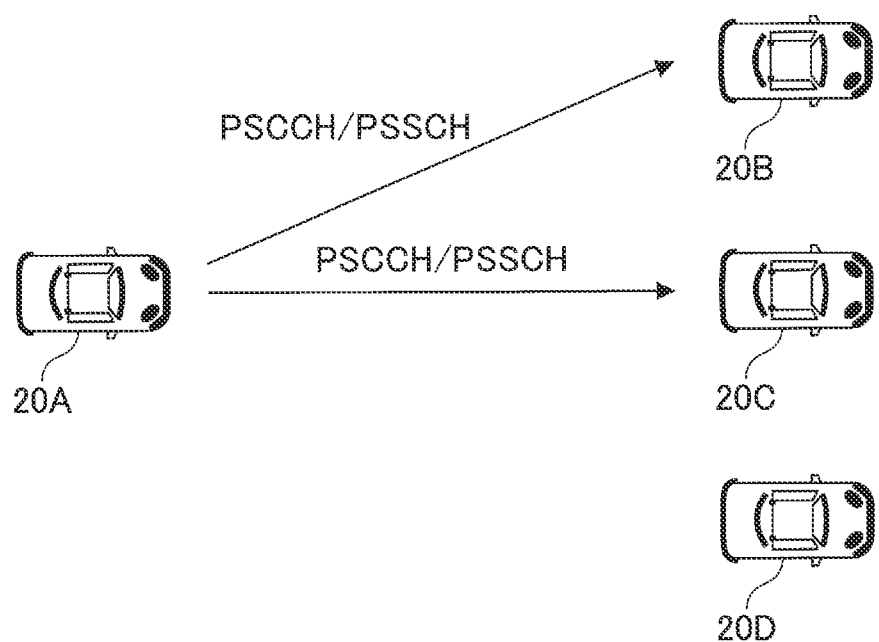
FIG. 7 is a diagram illustrating an example (1) of a communication type of V2X.

FIG. 7 is a diagram for illustrating an example (1) of a communication type of V2X. The sidelink communication type shown in FIG. 7 is unicast. A terminal 20A transmits PSCCH and PSSCH to terminal 20. In the example shown in FIG. 7, the terminal 20A unicasts a terminal 20B and unicasts a terminal 20C.

Figure 8:
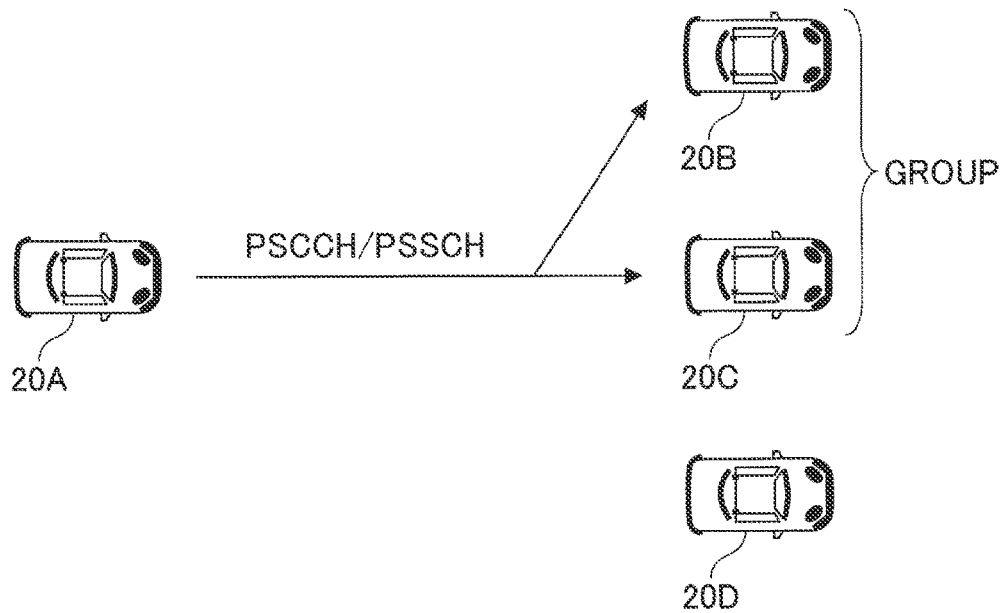
FIG. 8 is a diagram illustrating an example (2) of a communication type of V2X.

FIG. 8 is a diagram for illustrating an example (2) of a communication type of V2X. The sidelink communication type shown in FIG. 8 is a group cast. A terminal 20A transmits PSCCH and PSSCH to a group to which one or more terminals 20 belong. In the example shown in FIG. 8, the group includes a terminal 20B and a terminal 20C, and the terminal 20A performs group casting on the group.

Figure 9:
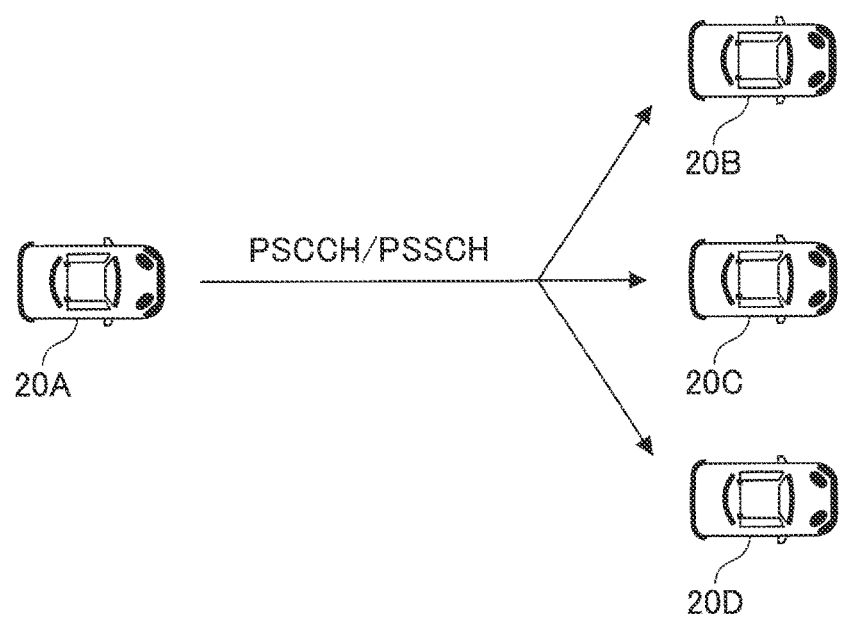
FIG. 9 is a diagram illustrating an example (3) of a communication type of V2X.

FIG. 9 is a diagram for illustrating an example (3) of a communication type of V2X. The sidelink communication type shown in FIG. 9 is broadcast. A terminal 20A transmits PSCCH and PSSCH to one or more terminals 20. In the example shown in FIG. 9, the terminal 20A broadcasts to a terminal 20B, a terminal 20C, and a terminal 20D. The terminal 20A shown in FIGS. 7 to 9 may be referred to as a header UE.

In addition, it is assumed that HARQ is supported for unicasts and group casts of sidelink in NR-V2X. In addition, Sidelink Feedback Control Information (SFCI) containing HARQ responses is defined in NR-V2X. In addition, SFCI transmission via Physical Sidelink Feedback Channel (PSFCH) is under review.

In the following description, although PSFCH is used in a transmission of HARQ-ACK on sidelink, this is an example. For example, PSCCH may be used to transmit HARQ-ACK on sidelink, PSSCH may be used to transmit HARQ-ACK on sidelink, or other channels may be used to transmit HARQ-ACK on sidelink.

Hereinafter, for convenience, overall information reported by a terminal 20 in HARQ is referred to as HARQ-ACK. This HARQ-ACK may also be referred to as HARQ-ACK information. More specifically, a codebook applied to information of HARQ-ACK reported from a terminal 20 to a base station 10 or the like is called a HARQ-ACK codebook. HARQ-ACK codebook defines bit strings of HARQ-ACK information. "HARQ-ACK" sends not only ACK but also NACK.

Figure 10:
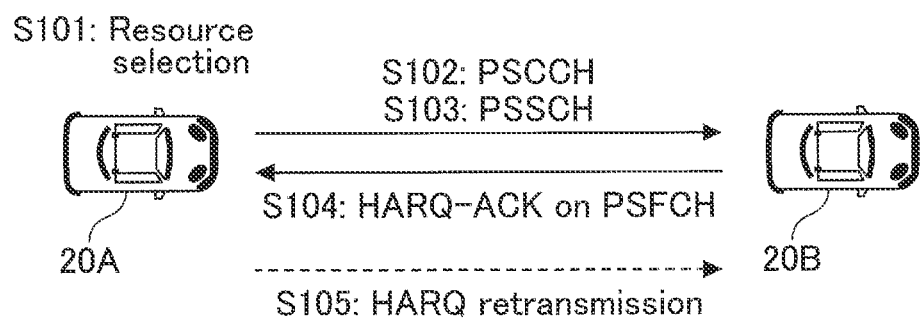
FIG. 10 is a diagram illustrating an example (1) of a configuration and operation of a wireless communication system according to an embodiment of the present invention.

FIG. 10 is a diagram illustrating an example (1) of a configuration and operation of a wireless communication system according to an embodiment of the present invention. As shown in FIG. 10, a wireless communication system according to an embodiment of the present invention includes a terminal 20A and a terminal 20B. In practice, there are a number of user devices, but FIG. 10 shows a terminal 20A and a terminal 20B as examples.

Hereinafter, when terminals 20A, 20B, or the like are not particularly distinguished, the term "terminal 20" or "user equipment" will be simply described. FIG. 10 illustrates, for example, a case where both a terminal 20A and a terminal 20B are within a cell coverage, but the operation according to an embodiment of the present invention can also be applied when the terminal 20B is outside of the coverage.

As described above, in this embodiment, a terminal 20 is, for example, a device mounted in a vehicle such as an automobile and has a cellular communication function as a UE in LTE or NR and a sidelink function. A terminal 20 may be a conventional portable terminal (such as a smartphone). A terminal 20 may also be an RSU. The RSU may be a UE-type RSU having a function of a UE or a gNB-type RSU having a function of a base station device.

A terminal 20 need not be a single housing device. For example, even when various sensors are distributed in a vehicle, the device including the various sensors is the terminal 20.

A processing contents for transmission data on sidelink of a terminal 20 are basically the same as those of UL transmission in LTE or NR. For example, a terminal 20 scrambles a code word of transmitted data, modulates to generate complex-valued symbols, and maps the complex-valued symbols to one or two layers and performs precoding. The precoded complex-valued symbols are then mapped to a resource element to generate a transmission signal (e.g., complex-valued time-domain SC-FDMA signal) and transmitted from each antenna port.

A base station 10 has a function of cellular communication as a base station in LTE or NR and a function of enabling communication of the terminal 20 according to the present embodiment (e.g., resource pool setting, resource allocation, etc.). A base station 10 may also be an RSU (gNB-type RSU).

In a wireless communication system according to an embodiment of the present invention, a signal waveform used by a terminal 20 for SL or UL may be OFDMA, SC-FDMA, or another signal waveform.

In step S101, a terminal 20A autonomously selects resources to be used for PSCCH and PSSCH from a resource selection window having a predetermined period. The resource selection window may be set from a base station 10 to a terminal 20.

In Step S102 and Step S103, the terminal 20A transmits Sidelink Control Information (SCI) via PSCCH and transmits SL data via PSSCH using the resources autonomously selected in Step S101. For example, the terminal 20A may transmit the SCI (PSCCH) using frequency resources adjacent to the PSSCH frequency resources with the same time resources of the PSSCH.

A terminal 20B receives the SCI (PSCCH) and the SL data (PSSCH) transmitted from the terminal 20A. The SCI received via the PSCCH may include information about a PSFCH resource for the terminal 20B to send HARQ-ACK for reception of the data. The terminal 20A may include information of the autonomously selected resource in the SCI and transmit it.

In step S104, the terminal 20B transmits HARQ-ACK for the received data to the terminal 20A using the PSFCH resource specified in the received SCI.

In step S105, when the HARQ-ACK received in step S104 requests retransmission, that is, the HARQ-ACK is a NACK (negative response), the terminal 20A retransmits the PSCCH and PSSCH to the terminal 20B. The terminal 20A may retransmit PSCCH and PSSCH using autonomously selected resources.

Figure 11:
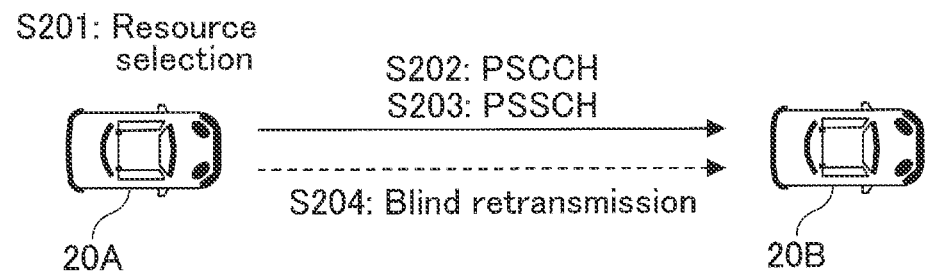
FIG. 11 is a diagram illustrating an example (2) of a configuration and operation of a wireless communication system according to an embodiment of the present invention.

FIG. 11 is a diagram illustrating an example (2) of the configuration and operation of a wireless communication system according to an embodiment of the present invention. Blind retransmissions without HARQ control may be performed to improve the transmission success rate or distance reached.

In step S201, a terminal 20A autonomously selects resources to be used for PSCCH and PSSCH from a resource selection window having a predetermined period. The resource selection window may be set from a base station 10 to a terminal 20.

In Step S202 and Step S203, the terminal 20A transmits SCI via PSCCH and transmits SL data via PSSCH using the resources autonomously selected in Step S201. For example, the terminal 20A may transmit the SCI (PSCCH) using frequency resources adjacent to the PSSCH frequency resources with the same time resources of the PSSCH.

In step S204, the terminal 20A retransmits the SCI via PSCCH and the SL data via PSSCH to the terminal 20B using the resources autonomously selected in step S201. Retransmissions in step S204 may be performed multiple times.

Figure 12:
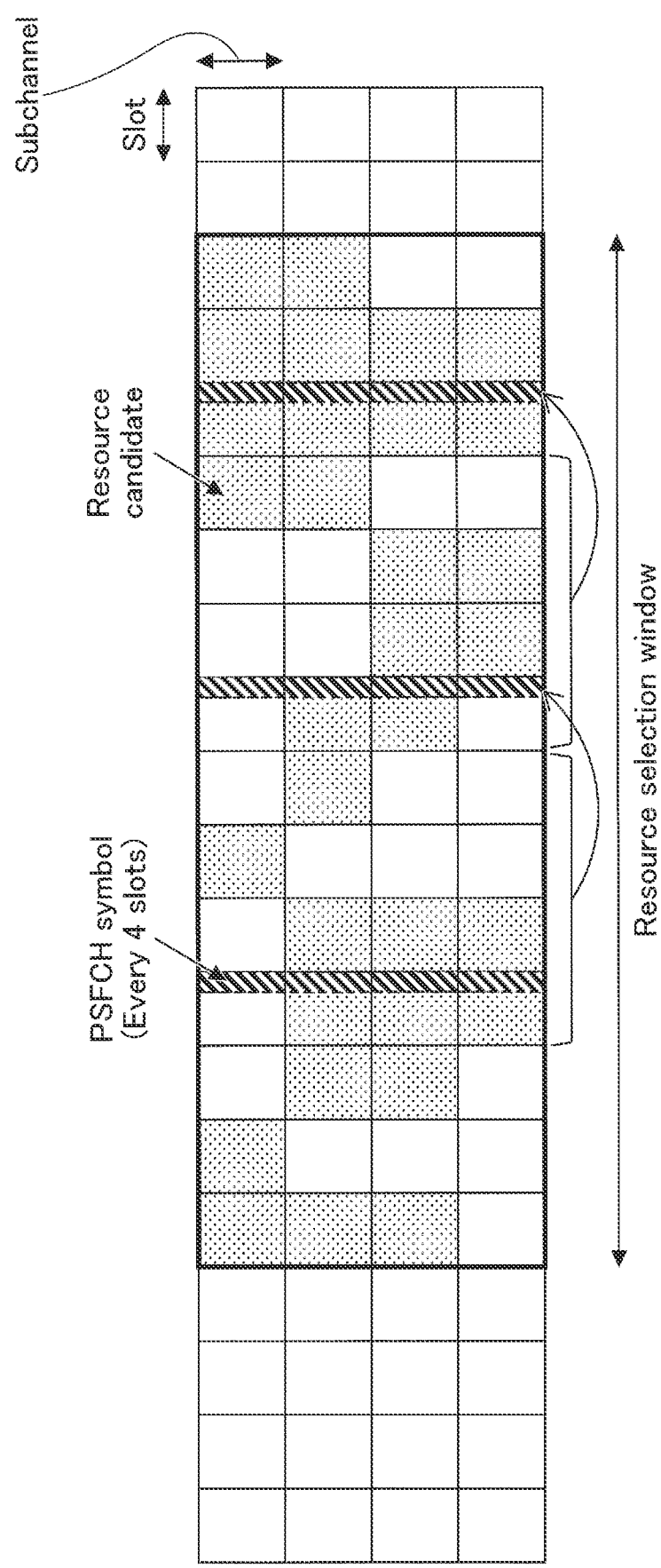
FIG. 12 is a diagram illustrating an example (1) of a resource layout according to an embodiment of the present invention.

FIG. 12 is a diagram illustrating an example (1) of a resource layout according to an embodiment of the present invention. FIG. 12 shows an example of autonomous resource selection by a terminal 20 in sidelink transmission mode 2. The terminal 20 determines a resource candidate to be used for transmission from a resource selection window. In addition, the terminal 20 may determine a resource candidate to be used for retransmission from the resource selection window. Hereinafter, "resource candidate" may be read as "resource candidate that transmits or retransmits PSCCH and PSCCH". One square of the horizontal axis of FIG. 12 corresponds to one slot, and one square of the vertical axis corresponds to a subchannel.

The resource candidates illustrated in FIG. 12 show candidates that can be used for both transmission and retransmission. For example, a resource candidate may be determined based on the result of measuring the power of the signals associated with each resource included in the resource selection window. In FIG. 12, a PSFCH symbol is set every 4 slots, but this is not limited.

Figure 13:
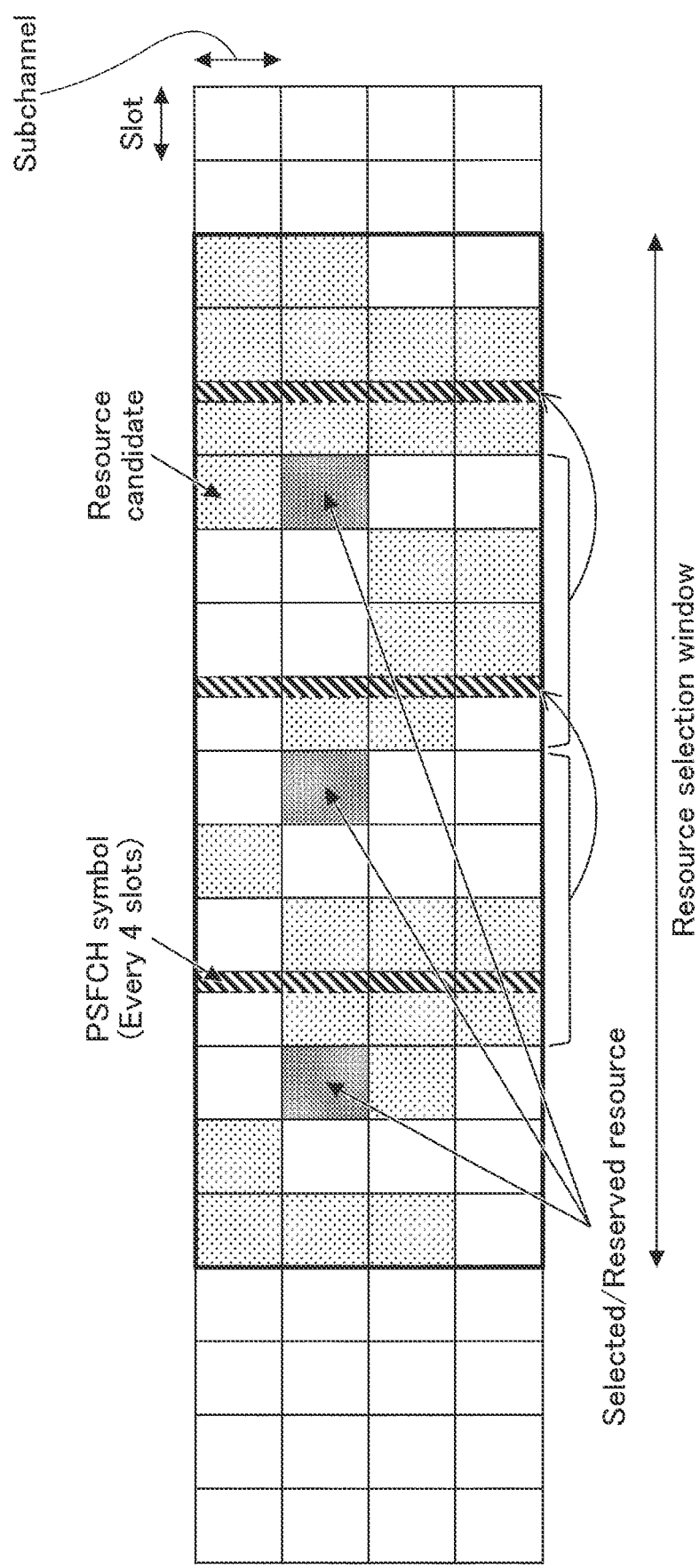
FIG. 13 is a diagram illustrating an example (2) of a resource layout according to an embodiment of the present invention.

FIG. 13 is a diagram illustrating an example (2) of a resource layout according to an embodiment of the present invention. In sidelink transmission mode 2, the maximum number of resources, selected or reserved for a single transmission by a terminal 20 among the resource candidates, may be specified. For example, the maximum number may be 2, 3 or 4. FIG. 13 shows an example where the maximum number is 3. The maximum number may be set to the same value regardless of whether HARQ control is enabled or disabled.

Here, when selecting a resource in consideration of resources used by a terminal 20 to transmit PSFCH, the following 1)-4) needs to be considered. Hereinafter, "HARQ-controlled retransmission" is also referred to as "HARQ retransmission".
1) Whether or not the resources used for blind retransmissions and the resources used for HARQ retransmissions are reserved separately
2) Time required for HARQ retransmission processing between PSFCH and retransmission of PSCCH and PSSCH
3) The likelihood that either of the PSFCH transmissions will be dropped if they overlap each other or if transmission and reception overlap
4) Resources not associated with PSFCH exist in the resource selection window Thus, a terminal 20 may perform resource selection to ensure reception of PSFCH in sidelink transmission mode 2. A terminal 20 may separate resource candidates into candidates for use in blind retransmissions and candidates for use in HARQ retransmissions. That is, a terminal 20 may identify a resource candidate as a candidate for use in blind retransmission or as a candidate for use in HARQ retransmission. Alternatively, a terminal 20 may identify a resource candidate as being used for HARQ retransmissions or as being not used for HARQ retransmissions. For example, a terminal 20 may execute a)-c) shown below.
a) A terminal 20 selects the resources used for blind retransmissions from resource candidates for blind retransmissions.
b) A terminal 20 selects resources used for HARQ retransmission from resource candidates for HARQ retransmission.
c) A sending terminal 20 determines whether the selected resource is a resource for blind retransmission or a resource for HARQ retransmission.

Figure 14:
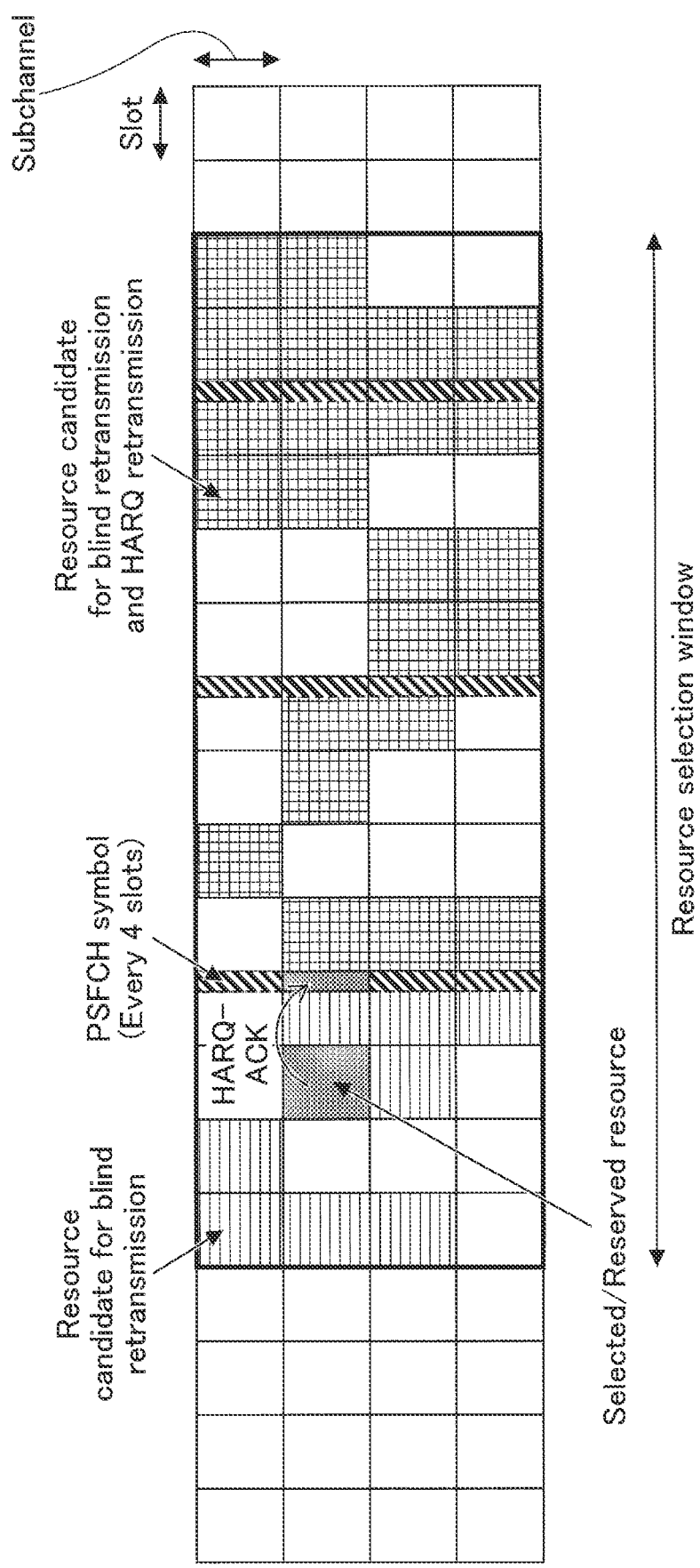
FIG. 14 is a diagram illustrating an example (3) of a resource layout according to an embodiment of the present invention.

FIG. 14 is a diagram illustrating an example (3) of a resource layout according to an embodiment of the present invention. FIG. 14 shows an example of a resource arrangement in which resource candidates are separated into candidates for use in blind retransmissions and candidates for use in HARQ retransmissions. In addition to a)-c) above, as shown in FIG. 14, the resources used for blind retransmission may be selected from resource candidates for blind retransmissions or resource candidates for blind retransmissions and HARQ retransmissions. It should be noted that, as shown in FIG. 14, PSFCH, on which HARQ responses corresponding to previously selected or reserved resources are sent and received, may be determined. The above method allows optimal resource selection to be applied to each retransmission procedure.

Figure 15:
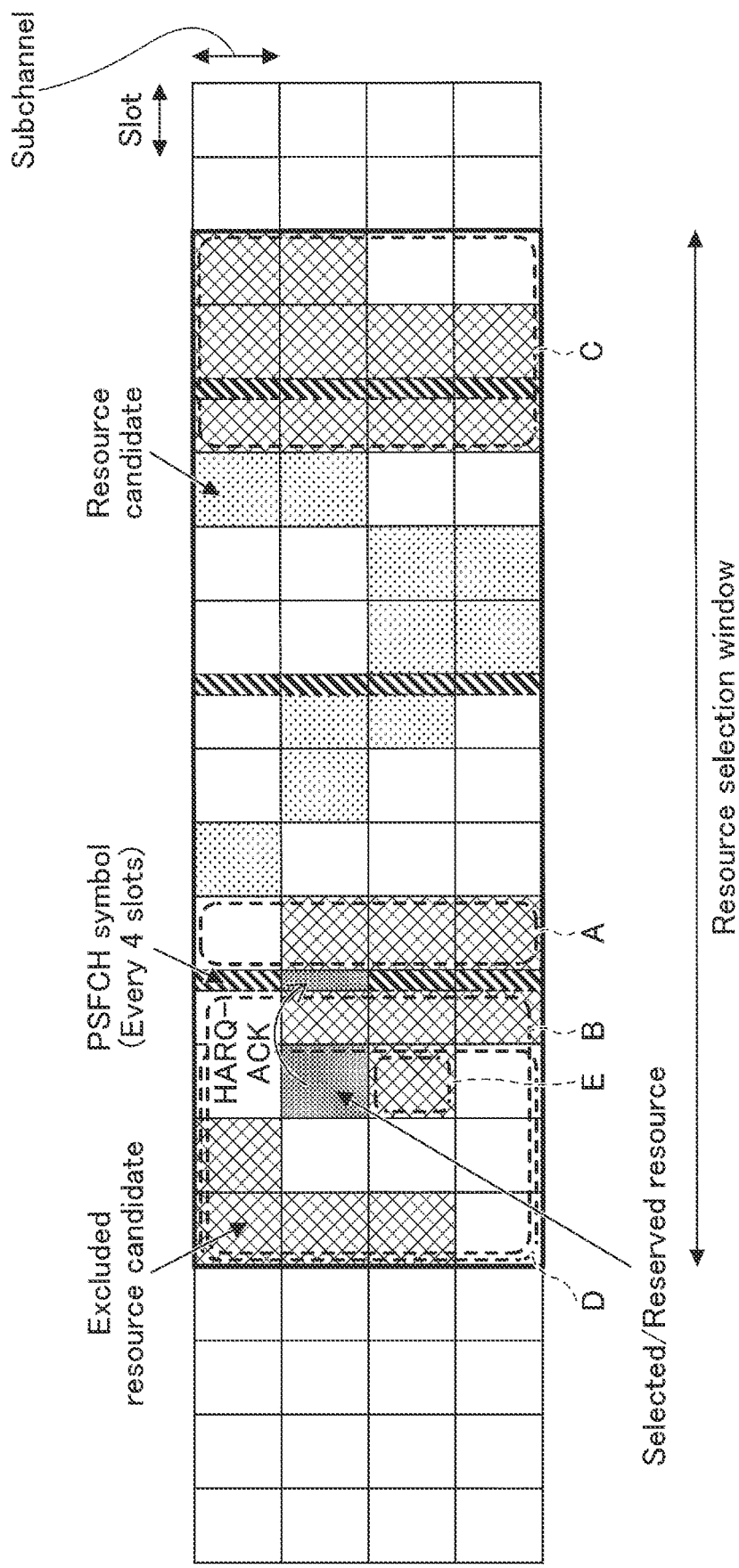
FIG. 15 is a diagram illustrating an example (4) of a resource layout according to an embodiment of the present invention.

FIG. 15 is a diagram illustrating an example (4) of a resource layout according to an embodiment of the present invention. A terminal 20 may exclude particular resource candidates so that it is not a resource candidate for HARQ retransmission, blind retransmission, or retransmission.

The particular resource candidate to be excluded may be a resource candidate in a case where there is no processing time gap between the resource candidate and the PSFCH corresponding to the previously selected resource. For example, resource candidates in the "A" range shown in FIG. 15 may be excluded because there is no processing time gap between the resource candidates and the PSFCH corresponding to the previously selected resource.

The particular resource candidates to be excluded may be resource candidates in a case where there is no processing time gap between the corresponding PSFCH and the previously selected resource. For example, resource candidates in the "B" range shown in FIG. 15 may be excluded because there is no processing time gap between the PSFCH corresponding to the resource candidates and the previously selected resource.

The particular resource candidates to be excluded may be resource candidates in a case where the corresponding PSFCH is not present in the resource selection window. For example, resource candidates in the range of "C" shown in FIG. 15 may be excluded because the corresponding PSFCH does not exist in the resource selection window.

The particular resource candidates to be excluded may be resource candidates in a case where the corresponding PSFCH overlaps in time domain the PSFCH corresponding to the previously selected resource. For example, resource candidates in the "D" range shown in FIG. 15 may be excluded because the PSFCH corresponding to the resource candidates overlaps in time domain the PSFCH corresponding to the previously selected resource. Note that among the overlapping PSFCHs to which priorities are assigned, the resource candidate corresponding to a lower priority PSFCH may be excluded. Among the overlapping PSFCHs, resource candidates exceeding N resource candidates, corresponding to the PSFCH, may be excluded. That is, up to N HARQ responses can be multiplexed into the PSFCH, and resource candidates corresponding to HARQ responses exceeding N HARQ responses may be excluded.

The particular resource candidates to be excluded may be resource candidates that overlap in time domain the previously selected resource. For example, resource candidates in the "E" range shown in FIG. 15 may be excluded because the resource candidates overlap in time domain the previously selected resource.

Note that the above "A" through "D" may be applied to resource candidates for HARQ retransmissions, to resource candidates for blind retransmissions, or to resource candidates for HARQ retransmissions and blind retransmissions. The above "E" may be applied to resource candidates for HARQ retransmissions and blind retransmissions. In the methods shown in "A" to "E" above, a terminal 20 can exclude resource candidates, that are not available or undesirable as resource candidates for retransmission, from resource candidates for HARQ retransmission, blind retransmission or retransmission.

Figure 16:
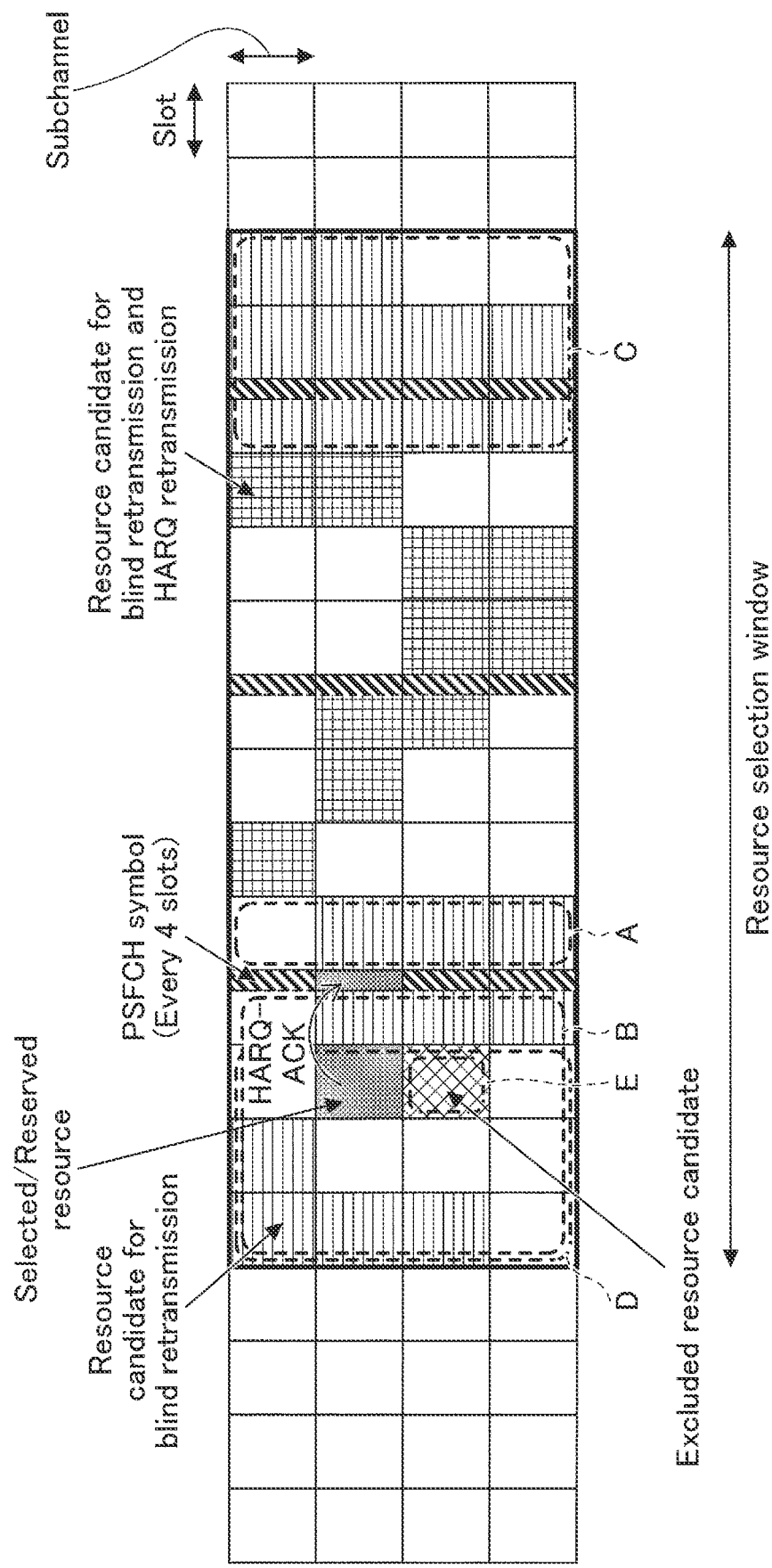
FIG. 16 is a diagram illustrating an example (5) of a resource layout according to an embodiment of the present invention.

FIG. 16 is a diagram illustrating an example (5) of resource layout according to an embodiment of the present invention. FIG. 16 is a resource arrangement example in which "A" to "D" shown in FIG. 15 are applied to resource candidates for HARQ retransmission and "E" is applied to resource candidates for HARQ retransmission and blind retransmission in the resource arrangement example in FIG. 14.

Resource candidates excluded from resource candidates for HARQ retransmissions by "A" to "D" shown in FIG. 15 become resource candidates for blind retransmissions as shown in FIG. 14. Resource candidates excluded from resource candidates for HARQ retransmission and blind retransmission by "E" shown in FIG. become resource candidates that are not used for any retransmission. Resource candidates not excluded by "A" to "E" shown in FIG. 15 are resource candidates for HARQ retransmission and blind retransmission as shown in FIG. 14.

Figure 17:
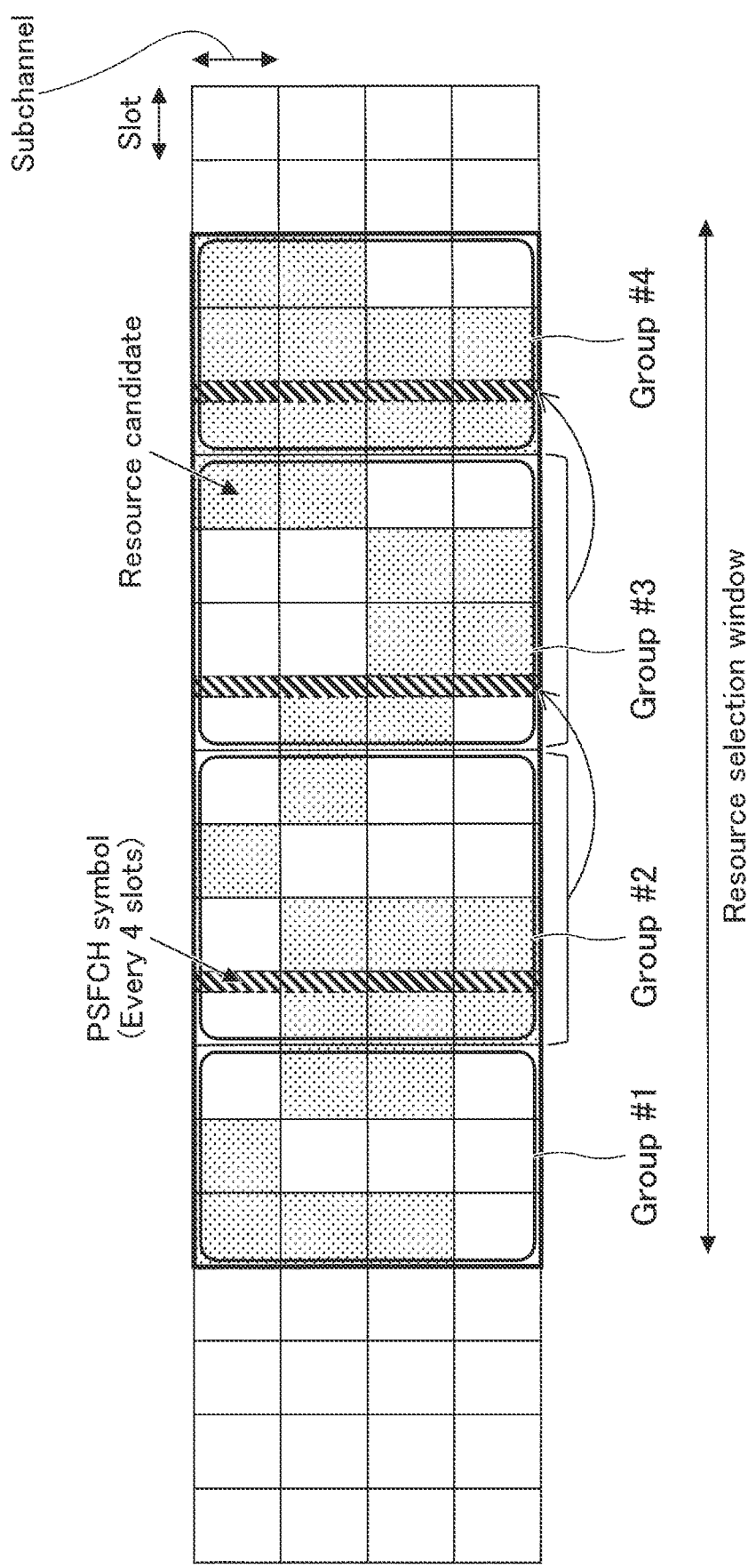
FIG. 17 is a diagram illustrating an example (6) of a resource layout according to an embodiment of the present invention.

FIG. 17 is a diagram illustrating an example of resource layout (6) according to an embodiment of the present invention. As shown in FIG. 17, resource candidates may be divided into several groups. The procedure for dividing resource candidates into groups may be configured or predefined.

As in group #1, group #2, group #3, and group #4 shown in FIG. 17, resource candidates corresponding to the same PSFCH timing (e.g., slot or symbol) may be grouped as one group.

In addition, multiple resource candidates selected from a single group and/or particular groups may be used as a resource for blind retransmissions. For example, if the resource candidates carry the same transport block, all HARQ responses may be assumed to be identical. For example, if the resource candidates carry the same transport block, the HARQ response may assume that one of the HARQ responses is transmitted. For example, the particular groups may be adjacent groups in time domain. For example, the groups adjacent to group #2 shown in FIG. 17 are group #1 and group #3.

For example, multiple resource candidates, each selected from multiple groups, may be used for HARQ retransmissions. For example, a resource candidate belonging to a particular group need not be selected as a resource candidate for HARQ retransmission. For example, a group adjacent to a group containing previously selected resource candidates need not be selected as a resource candidate for HARQ retransmission to ensure processing time required for HARQ control. In addition, a resource candidate that is not selected as a resource candidate for HARQ retransmission may be used as a resource for blind retransmission.

As shown in FIG. 17, when resource candidates are divided into groups, a receiving terminal 20 may assume that a resource candidate is a resource for blind retransmission or a resource candidate for HARQ retransmission.

In accordance with the above-described embodiment, a terminal 20 may select appropriate resources for HARQ retransmission and select appropriate resources for blind retransmission, depending on the layout of PSFCH, when a transmit mode in which a terminal selects resources autonomously is applied.

That is, a terminal can autonomously select resources in accordance with retransmission control in direct communication between terminals.

(Equipment Configuration)

Next, function configuration examples of a base station 10 and a terminal 20 that execute the processes and the operations described above will be described. The base station 10 and the terminal 20 have functions for implementing the embodiments described above. However, each of the base station 10 and the terminal 20 may have only some of the functions in the embodiment.

<Base Station 10>

Figure 18:
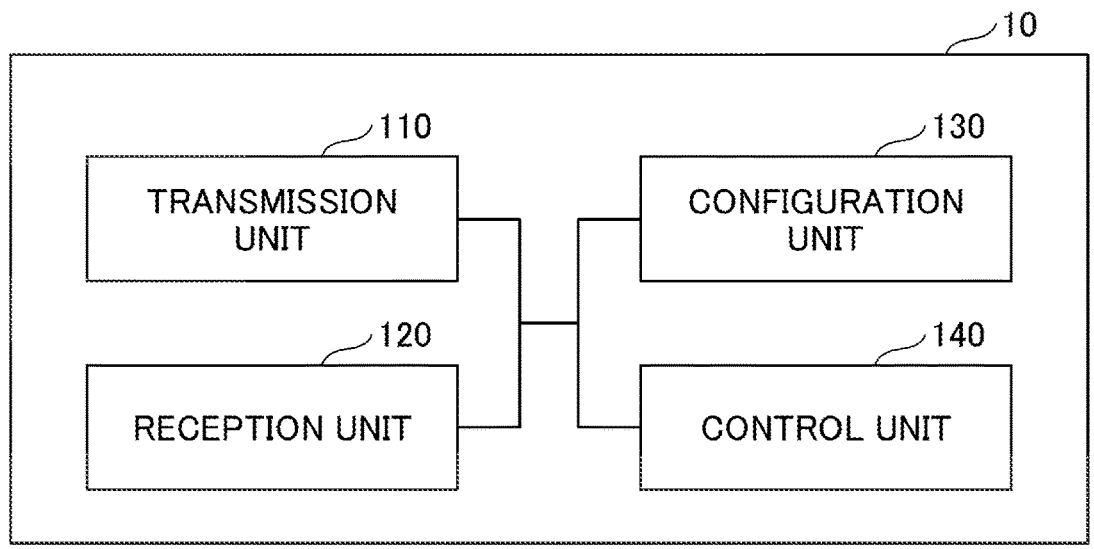
FIG. 18 is a diagram illustrating an example of a functional configuration of a base station 10 according to an embodiment of the present invention.

FIG. 18 is a diagram illustrating an example of a functional configuration of the base station 10. As illustrated in FIG. 18, the base station 10 includes a transmission unit 110, a reception unit 120, a configuration unit 130, and a control unit 140. The functional configuration illustrated in FIG. 18 is only an example. A functional classification and names of the functional unit may be any classification and any names as long as the operation according to an embodiment of the present invention can be executed.

The transmission unit 110 includes a function of generating a signal to be transmitted to the terminal 20 side and transmitting the signal wirelessly. The reception unit 120 includes a function of receiving various kinds of signals transmitted from the terminal 20 and acquiring, for example, higher layer information from the received signals. Further, the transmission unit 110 includes a function of transmitting NR-PSS, NR-SSS, NR-PBCH, DL/UL control signals and DL reference signals or the like to the terminal 20.

The configuration unit 130 stores setting information set in advance and various kinds of setting information to be transmitted to the terminal 20 in a storage device, and read from the storage device on demand. For example, content of the setting information is information related to configuration of D2D communication or the like.

As described in the embodiment, the control unit 140 performs processing related to the setting in which a terminal 20 performs D2D communication. The control unit 140 transmits scheduling of D2D communication and DL communication to a terminal 20 through the transmission unit 110. The control unit 140 receives information related to a HARQ response of D2D communication and DL communication from a terminal 20 via the reception unit 120. The control unit 140 receives a CSI report related to D2D communication from a terminal 20 via the reception unit 120. The functional unit related to signal transmission in the control unit 140 may be included in the transmission unit 110, and the functional unit related to signal reception in the control unit 140 may be included in the reception unit 120.

<Terminal 20>

Figure 19:
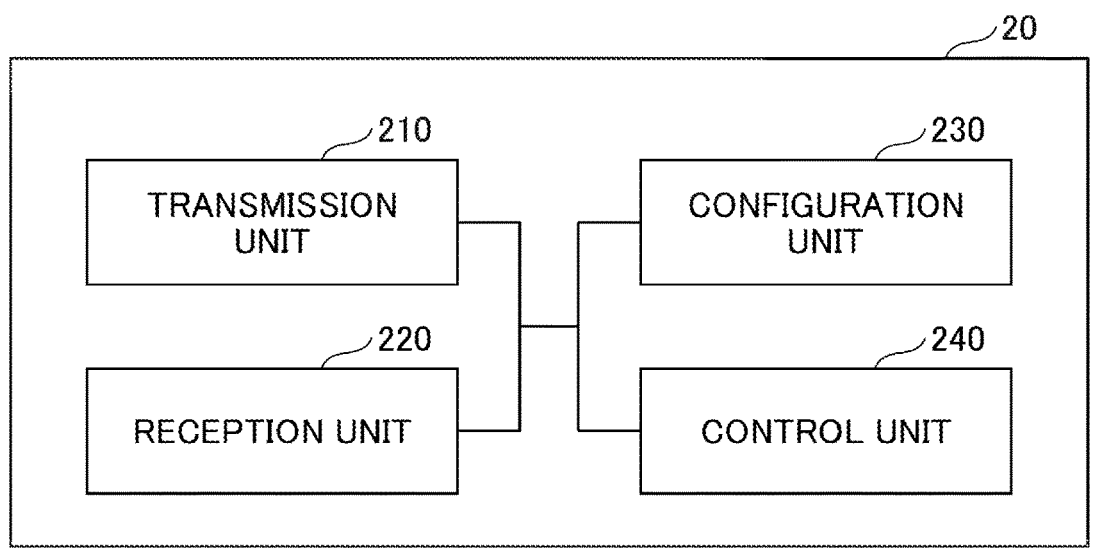
FIG. 19 is a diagram illustrating an example of a functional configuration of a terminal 20 according to an embodiment of the present invention.

FIG. 19 is a diagram illustrating an example of a functional configuration of the terminal 20. As illustrated in FIG. 19, the terminal 20 includes a transmission unit 210, a reception unit 220, a configuration unit 230, and a control unit 240. The functional configuration illustrated in FIG. 19 is only an example. A functional classification and names of the functional unit may be any classification and any names as long as the operation according to an embodiment of the present invention can be executed.

The transmission unit 210 generates a transmission signal from transmission data and transmits the transmission signal wirelessly. The reception unit 220 wirelessly receives various kinds of signals and acquires higher layer signals from received physical layer signals. The reception unit 220 includes a function of receiving NR-PSS, NR-SSS, NR-PBCH, and DL/UL/SL control signals and reference signals or the like transmitted from the base station 10. Further, for example, the transmission unit 210 transmits a physical sidelink control channel (PSCCH), a physical sidelink shared channel (PSSCH), a physical sidelink discovery channel (PSDCH), a physical sidelink broadcast channel (PSBCH), and the like to another terminal 20 as D2D communication, and the reception unit 220 receives PSCCH, PSSCH, PSDCH, PSBCH, and the like from another terminal 20.

The configuration unit 230 stores various kinds of setting information received from the base station 10 or a terminal 20 by the reception unit 220 in a storage device, and read from the storage device on demand. The configuration unit 230 also stores the preset setting information. For example, content of the setting information is information related to configuration of D2D communication or the like.

The control unit 240 controls D2D communication with other terminals 20 as described in the embodiment. The control unit 240 performs processing related to HARQ of D2D communication and DL communication. The control unit 240 transmits information related to a HARQ response of D2D communication to another terminal 20 scheduled from a base station 10 and DL communication to the base station 10. The control unit 240 may schedule D2D communication to another terminal 20. The control unit 240 may autonomously select resources used for D2D communication from a resource selection window. A functional unit related to signal transmission in the control unit 240 may be included in the transmission unit 210, and a functional unit related to signal reception in the control unit 240 may be included in the reception unit 220.

(Hardware Configuration)

In the block diagrams (FIG. 18 and FIG. 19) used for the description of the embodiment, the blocks of the functional units are illustrated. The functional blocks (configuring units) are implemented by an arbitrary combination of hardware and/or software. In addition, the implementation method of each function block is not particularly limited. In other words, each functional block may be implemented by one device which is physically or logically combined or may be implemented by a plurality of devices, that is, two or more devices which are physically and/or logically sepa-rated and are directly or indirectly connected (for example, a wired and/or wireless manner). The functional block may be implemented by combining software with the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expectation, regarding, broadcasting, notifying, communicating, forwarding, configuring, reconfiguring, allocating, mapping, assigning, and the like but are not limited thereto. For example, a functional block (configuring unit) that causes transmission to function is referred to as a transmission unit or a transmitter. In any case, as described above, an implementation method is not particularly limited.

Figure 20:
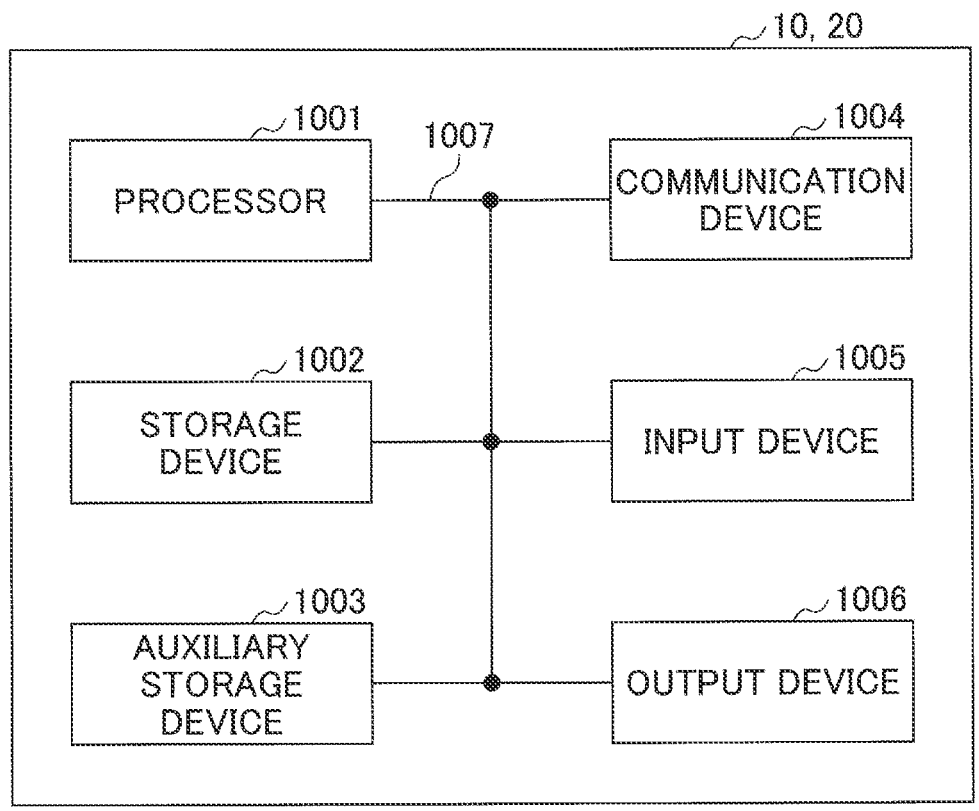
FIG. 20 is a diagram illustrating an example of a hardware configuration of a base station 10 or a terminal 20 according to an embodiment of the present invention.

For example, the base station 10, the terminal 20, or the like in one embodiment of the present disclosure may function as a computer for processing the present disclosure's wireless communication method. FIG. 20 is a diagram illustrating an example of a hardware configuration of the base station 10 and the terminal 20 according to an embodiment of the present disclosure. Each of the base station 10 and the terminal 20 may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station 10 and the terminal 20 may be configured to include one or more devices illustrated in the drawing or may be configured without including some devices.

Each function in the base station 10 and the terminal 20 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the control unit 140, the control unit 240, and the like described above may be implemented by the processor 1001.

Further, the processor 1001 reads a program (program code), a software module, or data from at least one of the auxiliary storage device 1003 and/or the communication device 1004 out to the storage device 1002, and executes various types of processes according to them. A program causing a computer to execute at least some of the operations described in the above embodiment is used as the program. For example, the control unit 140 of the base station 10 illustrated in FIG. 18 may be implemented by a control program which is stored in the storage device 1002 and operates on the processor 1001. Further, for example, the control unit 240 of the terminal 20 illustrated in FIG. 19 may be implemented by a control program which is stored in the storage device 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register", a "cache", a "main memory", or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage medium may be, for example, a database, a server, or any other appropriate medium including at least one of the storage device 1002 and the auxiliary storage device 1003.

The communication device 1004 is hardware (a transceiving device) for performing communication between computers via at least one of a wired network and a wireless network, and is also referred to as a "network device," a "network controller," a "network card," a "communication module," or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmitting/receiving unit, a transmission line interface, or the like may be implemented by the communication device 1004. The transmitting/receiving unit may be implemented to be physically or logically separated by a transmitting unit and a receiving unit.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. The input device 1005 and the output device 1006 may be integrated (for example, a touch panel).

The respective devices such as the processor 1001 and the storage device 1002 are connected via the bus 1007 to communicate information with each other. The bus 1007 may be configured with a single bus or may be configured with different buses between the devices.

Further, each of the base station 10 and the terminal 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented using at least one of these pieces of hardware.

SUMMARY OF EMBODIMENTS

As described above, according to an embodiment of the present invention, there is provided a terminal comprising a control unit configured to perform resource selection by which a channel receiving a response related to retransmission control is secured, in a case where the terminal selects a resource to be used autonomously from resource candidates, a transmission unit configured to transmit data to another terminal using the resource candidates, and a reception unit configured to receive a response related to retransmission control corresponding to the data from the another terminal.

With the above configuration, a terminal 20 may select appropriate resources for HARQ retransmission and select appropriate resources for blind retransmission, depending on the layout of PSFCH, when a transmit mode in which a terminal selects resources autonomously is applied. That is, a terminal can autonomously select resources in accordance with retransmission control in direct communication between terminals.

The control unit may identify resource candidates included in a resource selection window by dividing the resource candidates into: second resource candidates for retransmission by retransmission control corresponding to selected first resource candidates and third resource candidates that are not used for the retransmission by retransmission control corresponding to the first resource candidates, and identifies the third resource candidates as resource candidates for blind retransmission corresponding to the first resource candidates, and the transmission unit may retransmit the data to the other terminal using the second resource candidates in a case where the response related to retransmission control is negative acknowledgement. This configuration allows a terminal 20 to select appropriate resources for blind retransmission, depending on the arrangement of PSFCH, when the terminal is in a transmit mode in which the terminal autonomously selects the resources.

The control unit may exclude from resource candidates to be used for retransmission by retransmission control corresponding to the first resource candidates: resource candidates in a case where there is no time gap required for processing between the resource candidates and the channel for receiving the response by retransmission control corresponding to the selected first resource candidates; and resource candidates in a case where there is no time gap required for processing between the channel for receiving the response by retransmission control corresponding to the first resource candidates and the first resource candidates. This configuration allows a terminal 20 to select appropriate resources for HARQ retransmission and select appropriate resources for blind retransmission, depending on the layout of PSFCH, when a transmit mode, in which a terminal selects resources autonomously, is applied.

The control unit may exclude from resource candidates to be used for retransmission by retransmission control corresponding to the first resource candidates: resource candidates in a case where a channel for receiving a response by retransmission control corresponding to the resource candidates, overlaps in time domain the channel for receiving the response by retransmission control corresponding to the selected first resource candidates. This configuration allows a terminal 20 to select appropriate resources for HARQ retransmission and select appropriate resources for blind retransmission, depending on the layout of PSFCH, when a transmit mode, in which a terminal selects resources autonomously, is applied.

The control unit may identify a plurality of resource candidates as resource candidates to be used for blind retransmission corresponding to the selected first resource candidates, the plurality of resource candidates being selected in a group defined by resource candidates in a case where channels, arranged for receiving a response by retransmission control corresponding to the resource candidates, are same in time domain. This configuration allows a terminal 20 to select appropriate resources for blind retransmission, depending on the arrangement of PSFCH, when the terminal is in a transmit mode in which the terminal autonomously selects the resources.

Further, according to an embodiment of the present invention, there is provided a communication method executed by a terminal comprising selecting a resource for acquiring a channel for receiving a response related to retransmission control, in a case where the terminal selects a resource autonomously from resource candidates, transmitting data to another terminal using the resource candidates, and receiving the response related to retransmission control corresponding to the data from the another terminal.

With the above configuration, a terminal 20 may select appropriate resources for HARQ retransmission and select appropriate resources for blind retransmission, depending on the layout of PSFCH, when a transmit mode, in which a terminal selects resources autonomously, is applied. That is, a terminal can autonomously select resources in accordance with retransmission control in direct communication between terminals.

Supplement to Embodiments

The embodiments of the present invention have been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station 10 and the terminal 20 have been described using the functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Further, an indication of information is not limited to the aspect or embodiment described in the present disclosure and may be given by any other method. For example, the indication of information may be given by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB))), other signals, or a combination thereof. Further, the RRC signaling may be referred to as an RRC message and may be, for example, an RRC connection setup message, an RRC connection reconfiguration message, or the like.

Each aspect and embodiment of the present invention may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, a next generation systems extended on the basis of these standards, or the like. Further, a plurality of systems may be combined and applied (for example, a combination of at least one of LTE and LTE-A and 5G or the like).

The processing procedures, the sequences, the flowcharts, and the like of the respective aspects/embodiments described in this specification may be reversed in order unless there is a contradiction. For example, the method described in the present disclosure presents elements of various steps using an exemplary order and is not limited to a presented specific order.

In this specification, a specific operation that is supposed to be performed by the base station 10 may be performed by an upper node in some cases. In the network including one or more network nodes including the base station 10, various operations performed for communication with the terminal 20 can be obviously performed by at least one of the base station and any network node (for example, an MME, an S-GW, or the like is considered, but it is not limited thereto) other than the base station 10 and/or the base station 10. The example in which the number of network nodes excluding the base station 10 is one has been described above, but other network nodes in which a plurality of other network nodes (for example, an MME and an S-GW) are combined may be provided.

Information, a signal, or the like described in the present disclosure may be output from an upper layer (or a lower layer) to a lower layer (or an upper layer).

Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using at least one of a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names allocated to the various channels and the information elements are not limited in any respect.

In the present disclosure, the terms "base station (BS)," "radio base station," "base station," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, it may also be referred to as a remote terminal, handset, user agent, mobile client, client, or some other suitable term.

At least one of the base station and the mobile station may be also referred to as a transmitting device, a receiving device, a communication device, or the like. At least one of the base station and the mobile station may be a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of user terminal 20 (for example, which may be referred to as device-to-device (D2D) or vehicle-to-everything (V2X)). In this case, the terminal 20 may have the functions of the base station 10 described above. Further, the terms "uplink" and "downlink" may be replaced with terms (for example, "side") corresponding to inter-terminal communication. For example, an uplink channel, a downlink channel, or the like may be read with side channels.

Similarly, the user terminal in the present disclosure may be replaced with the base station. In this case, the base station may have the functions of the above-mentioned user terminal.

The terms "determining" and "deciding" used in this specification may include a wide variety of actions. For example, "determining" and "deciding" may include, for example, events in which events such as judging, calculating, computing, processing, deriving, investigating, looking up, search, and inquiry (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding." Further, "determining (deciding)" may be replaced with "assuming," "expecting," "considering," or the like.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "on the basis of" used in the present disclosure is not limited to "on the basis of only" unless otherwise stated.

In other words, a phrase "on the basis of" means both "on the basis of only" and "on the basis of at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be replaced with "unit," "circuit," "device," or the like.

In a case in which "include," "including," and variations thereof are used in the present disclosure, these terms are intended to be comprehensive, similarly to a term "comprising." Further, the term "or" used in the present disclosure is intended not to be an exclusive-OR.

A radio frame may include one or more frames in time domain.

In time domain, each of one or more frames may be referred to as a sub frame. The sub frame may further include one or more slots in time domain. The sub frame may have a fixed time length (for example, 1 ms) not depending on numerology.

The numerology may be a communication parameter applied to at least one of transmission and reception of a certain signal or channel. For example, the numerology may indicate at least one of a sub carrier spacing (SCS), a bandwidth, a symbol length, a cyclic prefix length, a transmission time interval (TTI), a number of symbols per TTI, a radio frame configuration, a specific filtering process performed in frequency domain by a transceiver, a specific windowing process performed in time domain by a transceiver, and the like.

The slot may include one or more symbols (orthogonal frequency division multiplexing (OFDM) symbols, single carrier frequency division multiple access (SC-FDMA) symbols, or the like) in time domain. The slot may be a time unit based on the numerology.

The slot may include a plurality of mini slots. Each mini slot may include one or more symbols in time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a sub frame, a slot, a mini slot, and a symbol indicates a time unit for transmitting a signal. As a radio frame, a sub frame, a slot, a mini slot, and a symbol, different designations respectively corresponding to them may be used.

For example, one sub frame may be referred to as a transmission time interval (TTI: Transmission Time Interval), or a plurality of consecutive sub frames may be referred to as TTIs, or one slot or one mini slot may be referred to as a TTI. In other words, at least one of the sub frame and the TTI may be a sub frame (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the sub frame.

Here, for example, the TTI refers to a minimum time unit of scheduling in wireless communication. For example, in the LTE system, the base station performs scheduling of allocating a radio resource (a frequency bandwidth, a transmission power, or the like which can be used in each user terminal 20) to each user terminal 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is given, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) constituting the minimum time unit of scheduling may be controlled.

A TTI having a time length of 1 ms may be referred to as a common TTI (TTI in LTE Rel. 8 to 12), a normal TTI, a long TTI, a common sub frame, a normal sub frame, a long sub frame, a slot, or the like. A TTI shorter than the common TTI may be referred to as a reduced TTI, a short TTI, a partial TTI (a partial or fractional TTI), a reduced sub frame, a short sub frame, a mini slot, a sub slot, a slot, or the like.

Further, a long TTI (for example, a common TTI, a sub frame, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in time domain and frequency domain and may include one or more consecutive subcarriers in frequency domain. The number of sub carriers included in an RB may be the same irrespective of a numerology and may be, for example, 12. The number of sub carriers included in an RB may be decided on the basis of a numerology.

Further, a time domain of an RB may include one or more symbols and may be a length of one slot, one mini slot, one sub frame, or one TTI. Each of one TTI, one sub frame, or the like may be constituted by one or more resource blocks.

Further, one or more RBs may be referred to as a physical resource block (PRB), a sub carrier group (SCG), a resource element group (REG), a PRB pair, an RB pair, or the like.

Further, the resource block may be constituted by one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it may not be assumed that the UE transmits and receives a predetermined signal/channel outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of sub frames included in a radio frame, the number of slots per sub frame or radio frame, the number of mini slots included in a slot, the number of symbols and RBs included in a slot or a mini slot, the number of sub carriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is the plural.

In the present disclosure, a term "A and B are different" may mean "A and B are different from each other." Further, the term may mean "each of A and B is different from C." Terms such as "separated," "coupled," or the like may also be interpreted in similarly to "different."

Each aspect/embodiment described in this specification may be used alone, in combination, or may be switched in accordance with the execution. Further, indication of predetermined information (for example, indication of "being X") is not limited to being performed explicitly, but may be performed by implicit (for example, by giving no indication of predetermined information).

In the present disclosure, HARQ retransmission is an example of retransmission by retransmission control. HARQ response is an example of a response related to retransmission control. ACK is an example of a positive response. NACK is an example of a negative response. PSFCH is an example of a channel receiving a response related to retransmission control.

Although the present disclosure has been described above in detail, it is obvious to those skilled in the art that the present disclosure is not limited to the embodiments described in the present disclosure. The present disclosure may be implemented as revised and modified forms without departing from the gist and scope of the present disclosure as configured forth in claims. Therefore, the description of the present disclosure is for the purpose of illustration and does not have any restrictive meaning to the present disclosure.

REFERENCE SIGNS LIST

10 BASE STATION
110 TRANSMISSION UNIT
120 RECEPTION UNIT
130 CONFIGURATION UNIT
140 CONTROL UNIT
20 TERMINAL
210 TRANSMISSION UNIT
220 RECEPTION UNIT
230 CONFIGURATION UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a processor that selects, from multiple resources, resources for sidelink transmission based on a time gap between each of the multiple resources; and
a transmitter that performs the sidelink transmission using the selected resources,
wherein a time gap between each of the selected resources includes a time required for sidelink retransmission, and
wherein if the time gap between each of the multiple resources does not include the time required for sidelink retransmission and a time required for reception of a sidelink feedback channel, the processor excludes the multiple resources as resources for the sidelink transmission.

2. The terminal according to claim 1, wherein the time gap between each of the selected resources includes the time required for sidelink retransmission and a time required for reception of a sidelink feedback channel.

3. The terminal according to claim 1, wherein a mode for resource allocation in sidelink transmission is selectable from a mode 1 and a mode 2.

4. A communication method performed by a terminal comprising:
selecting, from multiple resources, resources for sidelink transmission based on a time gap between each of the multiple resources; and
performing the sidelink transmission using the selected resources,
wherein a time gap between each of the selected resources includes a time required for sidelink retransmission, and
wherein if the time gap between each of the multiple resources does not include the time required for sidelink retransmission and a time required for reception of a sidelink feedback channel, the terminal excludes the multiple resources as resources for the sidelink transmission.

5. A wireless communication system comprising:
a first terminal; and
a second terminal, wherein
the first terminal and the second terminal perform sidelink communication with each other,
the first terminal:
selects, from multiple resources, resources for sidelink transmission based on a time gap between each of the multiple resources; and
performs the sidelink transmission using the selected resources, and
a time gap between each of the selected resources includes a time required for sidelink retransmission,
wherein if the time gap between each of the multiple resources does not include the time required for sidelink retransmission and a time required for reception of a sidelink feedback channel, the first terminal excludes the multiple resources as resources for the sidelink transmission.

* * * * *